United States Patent [19]
Payne

[11] 3,982,776
[45] Sept. 28, 1976

[54] APPARATUS FOR CONNECTING SUBMARINE PIPELINES TO OFFSHORE STRUCTURES

[75] Inventor: William P. Payne, Houston, Tex.

[73] Assignee: Sun Oil Company (Delaware), Dallas, Tex.

[22] Filed: Sept. 12, 1974

[21] Appl. No.: 505,406

[52] U.S. Cl. .................................. 285/24; 61/110; 285/3; 285/39; 285/93; 285/317; 285/DIG. 21

[51] Int. Cl.² .......................................... F16L 35/00

[58] Field of Search .......... 285/24, 18, 27, DIG. 21, 285/25, 39, 26, 3, 28, 317, 29, 93, 96, 106; 166/.5, .6, 113, 66; 61/72.3; 73/40.5, 46; 29/429

[56] References Cited
UNITED STATES PATENTS

| | | | |
|---|---|---|---|
| 3,482,410 | 12/1969 | Roesky et al. | 61/72.3 |
| 3,585,805 | 6/1971 | Vincent | 166/.6 |
| 3,591,204 | 7/1971 | Shipes | 285/26 |
| 3,645,563 | 2/1972 | Rochelle | 285/24 |
| 3,795,115 | 3/1974 | Bergquist | 285/18 X |
| 3,795,138 | 3/1974 | Hasha | 73/46 |
| 3,842,612 | 10/1974 | Arnold | 285/24 X |
| 3,846,992 | 11/1974 | Liautaud | 61/72.3 |

Primary Examiner—Dave W. Arola
Attorney, Agent, or Firm—J. Edward Hess; Donald R. Johnson; William C. Roch

[57] ABSTRACT

For connecting an offshore structure to a submarine pipeline, a vertically-extending pipeline is built as an integral part of the structure and is provided with a receiver fitting at its lower end which is adapted to mate with a connector fitting provided on the end of the submarine pipeline. By means of special tools, all manipulatable from the surface, mating, locking, and sealing of the two fittings are accomplished, followed by pressure testing of the coupling between such fittings.

10 Claims, 9 Drawing Figures

3,982,776

APPARATUS FOR CONNECTING SUBMARINE PIPELINES TO OFFSHORE STRUCTURES

This invention relates to the connection of underwater pipelines to offshore oil or gas production structures.

At the present time, two different methods are employed for connecting underwater (submarine) pipelines to offshore oil or gas production structures.

The first method involves placing the vertical portion of the pipeline on the outside of the structure after the structure is in place in the water. This method is commonly referred to as the "conventional riser" method, and requires the clamping of the vertical or riser portion to a structure leg, using divers. One procedure for installing a riser is to attach an elbow to the pipeline with the end of the line on the lay barge. Joints of pipe are then attached one at a time, and the line is lowered until sufficient vertical pipe has been added to reach bottom. Divers then clamp the riser to the structure. Another procedure for riser installation is to clamp the riser to the structure, following which a diver makes the connection between the riser and the pipeline on the ocean floor.

The second method for connecting a submarine pipeline to an offshore structure is commonly referred to as the "pull tube" or "J-tube" method. This method requires that a pipe larger than that to be used as the pipeline be fabricated into the structure, prior to the structure being placed in the water. This pipe or J-tube has a large radius bend between its vertical portion and its horizontal portion, at the bottom of the structure. A cable is threaded through the tube, and the two ends are tied together and left at the top of the structure. After the structure is installed in the water and a pipeline is laid to it, the cable ends are untied, and the lower end is attached to the end of the pipeline. A winching device is used to pull the upper end of the cable, thereby pulling the pipeline up through the J-tube to the top of the structure.

The J-tube method works very well when it is employed at the start of a pipeline, but if the pipe must be pulled through the tube at the end of a pipeline, after having laid pipe from some other point, problems arise. In this latter situation, the pipe lay barge must lay sufficient pipe past the structure to account for the length required to be pulled vertically. After laying past the structure, a slack loop must be pulled in the pipe already on the bottom in order to pull the end of the line back far enough to enter the J-tube. Then, the pulling of the required slack loop often results in the pipeline being kinked; the kinked section must be cut out and replaced, and the operation repeated until a successful pull has been made.

An object of this invention is to provide a novel method for connecting underwater pipelines to offshore structures.

Another object is to provide a novel combination of tools for connecting underwater pipelines to offshore structures.

A further object is to provide a method for connecting underwater pipelines to offshore structures which does not require divers, and is therefore feasible in water depths beyond the capabilities of divers.

A still further object is to provide an underwater pipeline connection method which does not require that the pipeline be pulled to the surface through a tube, thereby avoiding the necessity for slack loops with resulting pipeline kinks.

Yet another object is to provide a method, for connecting and sealing an underwater pipeline to an offshore structure, wherein all manipulation is done from the surface.

A detailed description of the invention follows, taken in conjunction with the accompanying drawings, wherein.

Figure 1:
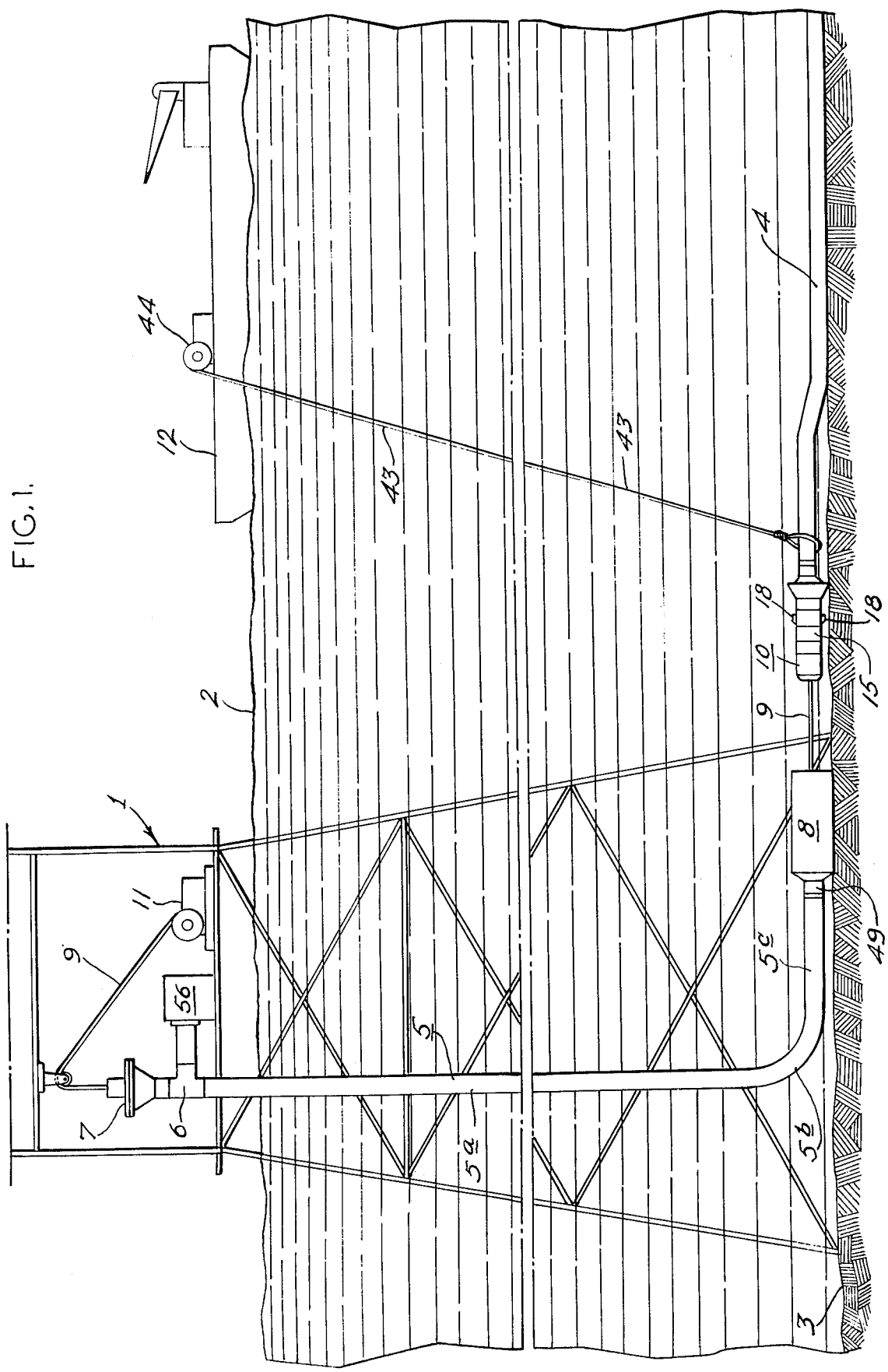
FIG. 1 is a diagrammatic illustration of the method and apparatus of this invention, during the initial portion of the placement step.

Referring first to FIG. 1, the lower portion of an offshore oil or gas production structure, denoted generally by numeral 1, is illustrated as extending below the water surface 2 and resting on the bottom (mud line) 3. This invention discloses a method and apparatus for connecting the offshore structure 1 to one end of a submarine (underwater) pipeline 4, which latter is illustrated as resting on the bottom 3.

According to this invention, a section of pipe 5, of the same size and pressure rating as that intended for the pipeline 4, is fabricated into the structure 1, as shown in FIG. 1. The pipe 5 has a vertical portion 5a, which extends from above the surface 2 to the bottom 3, this portion being joined by a large radius bend 5b to a horizontal portion 5c. At the upper end of the vertical portion 5a, a tee fitting 6 is installed, with a detachable wire rope stuffing box 7 on top.

A receiver fitting, denoted generally by numeral 8 and described later in more detail, is welded to the lower end of pipe 5, at the bottom of structure 1. During fabrication, a wire rope 9 is threaded through pipe 5, and the ends are tied together and attached to the top of the structure 1.

After the structure 1 has been installed in the water, the pipeline 4 is laid to the structure and a connector fitting, denoted generally by numeral 10 and described later in more detail, is welded to the structure end of the pipeline 4. The ends of wire rope 9 are untied and the upper end is connected into a winching system 11 on the structure 1, while the lower end is passed to the pipe lay barge 12, which is utilized during the placement step of the connecting operation.

Figure 2:
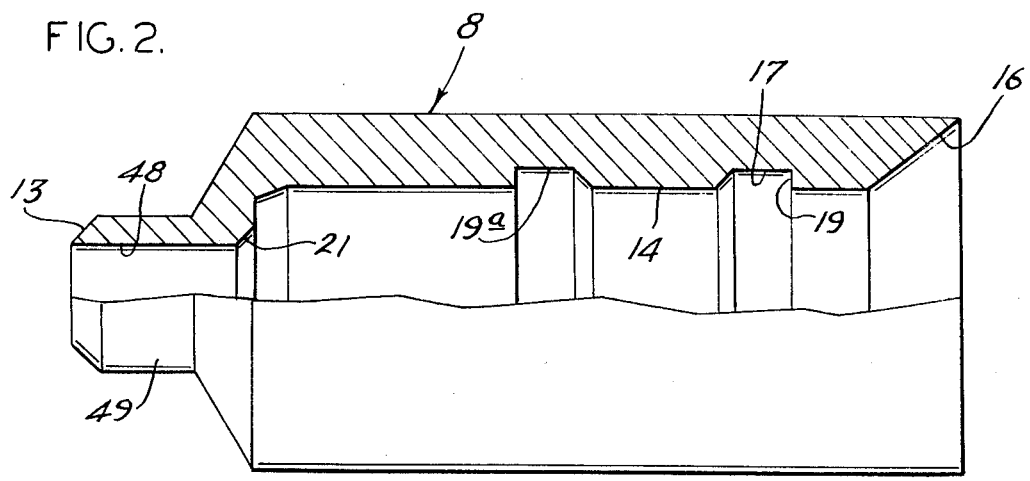
FIG. 2 is a front view, partly in longitudinal section, of a receiver fitting according to the invention.

Refer now to FIG. 2, which illustrates the construction of the receiver 8. The receiver 8 is a cylindrical body fabricated from steel having dimensions and physical properties which are compatible with the intended pipeline size and pressure rating. It provides the underwater connection on the part of the pipe 5. At its front end, receiver 8 has a beveled end 13 for welding to the lower end of pipe 5 in the fabrication process. Receiver 8 has an internal bore sized to accommodate therein the O.D. of the connector 10, this bore including a sealing surface 14 (internal cylindrical wall) adapted to form a seal with a sealing element 15 (see FIG. 3) mounted on the connector 10.

At its rear, receiver 8 has a frusto-conical guide surface (cone-shaped entry) 16 to guide the front end of the connector 10 as it is pulled into the receiver 8. Forwardly of the guide surface 16, receiver 8 has therein a rear circumferentially-extending internal locking recess or groove 17 which is adapted to receive the rear locking dog assembly 18 (see FIG. 3) of the connector 10, as the latter is pulled into place in the receiver. At its rear end, groove 17 has a forwardly-facing locking surface 19. Forwardly of recess 17, and forwardly of the sealing surface 14, receiver 8 has therein a front circumferentially-extending internal locking recess or groove 19a which is adapted to receive the front locking dog assembly 20 of the connector 10.

Figure 5:
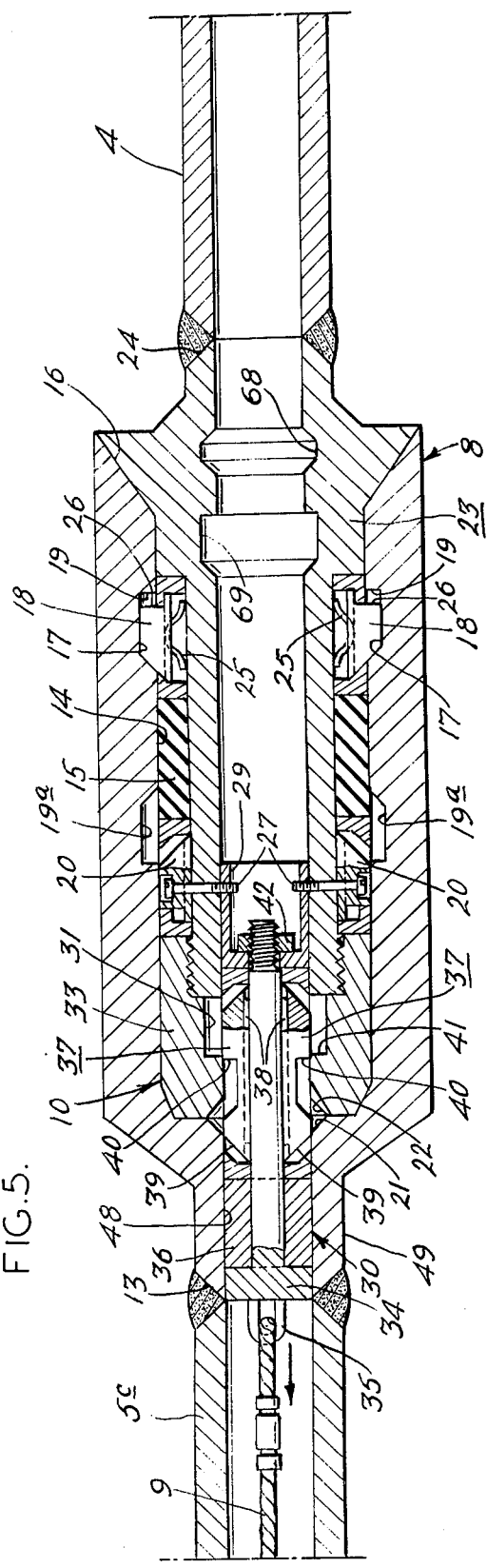
FIG. 5 is a longitudinal section of the assemblage of placement tool, connector fitting, and receiver fitting as they would appear at one stage in the installation procedure.

Near its forward end, receiver 8 has a beveled internal surface (frusto-conical surface 21) which cooperates with an oppositely-beveled surface 22 (see FIG. 3) on the front end of connector 10 to form (when the connector is pulled into its locked position in receiver 8) a placement tool releasing profile; the combination of surfaces 21 and 22 forms (see FIG. 5) a composite groove of V-shaped configuration.

Figure 3:
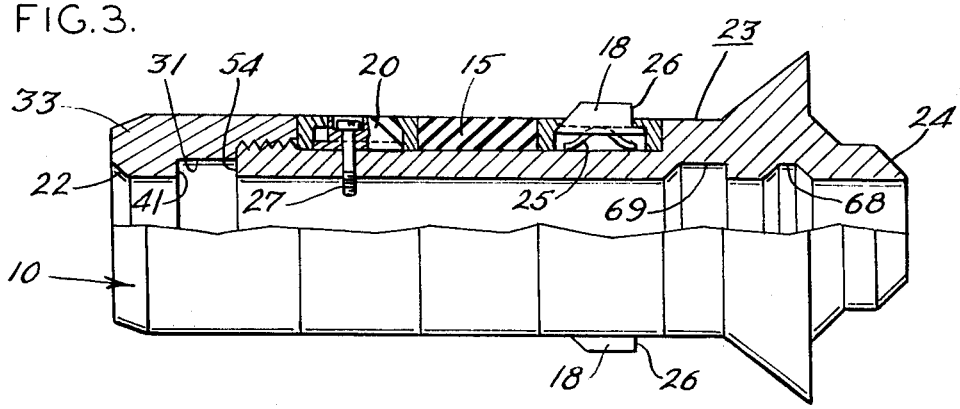
FIG. 3 is a front view, partly in longitudinal section, of a connector fitting according to the invention.

Refer now to FIG. 3. The connector 10 is a generally cylindrical body fabricated from steel having dimensions and physical properties which are compatible with the intended pipeline size and pressure rating. It provides the underwater connection on the part of the pipeline 4 which is laid to the structure 1 (FIG. 1) by the pipe lay barge 12. The connector 10 is pulled into or mated with the receiver 8, and has features which allow it to be locked and sealed into position.

The connector mandrel 23 comprises the main body of the connector 10, around which all other connector components are placed. At its rear end, the mandrel 23 has a beveled end 24 for welding to the structure end of the pipeline 4. The rear locking dog assembly 18, which is located forwardly from the beveled end 24, is spring loaded (by means of a spring 25) such that it is yieldably biased outwardly beyond the main portion of the mandrel body; the spring 25 forces the dog 18 into the rear locking recess 17 of the receiver 8 when the connector 10 is pulled into proper position, and dog 18 has a rearwardly-facing locking surface 26 which is adapted to engage the locking surface 19 of the receiver.

Forwardly of the assembly 18, the connector 10 carries the external sealing element 15, shown in its relaxed position in FIG. 3.

The front locking dog assembly 20, located forwardly of the sealing element 15, has a spring loaded dog (spring not shown). The dog has holes to receive one or more shear screws 27, which pass through the dog assembly 20 and the connector mandrel 23 and are screwed into respective tapped holes 28 (see FIG. 4) in the skirt 29 of the placement tool 30 to hold the dog in the collapsed position (illustrated in FIG. 3); this allows the front dog 20 to pass through the front locking recess 19a of the receiver 8 without engaging during the placement process.

Near the forward end of connector 10, there is an internal U-shaped recess or groove 31 comprising a placement tool and setting tool profile. This profile accommodates the dogs of the placement tool 30 and of the setting tool 32 (both to be later described) during each respective process.

The connector nose 33, threadedly secured to the front end of mandrel 23, serves to retain the two dog assemblies 18 and 20 and the sealing element 15.

The placement tool releasing profile 22, previously referred to, works in conjunction with the similar profile 21 in the receiver 8, to collapse the dogs of the placement tool 30 when the connector 10 is pulled into its locked position in receiver 8.

Figure 4:
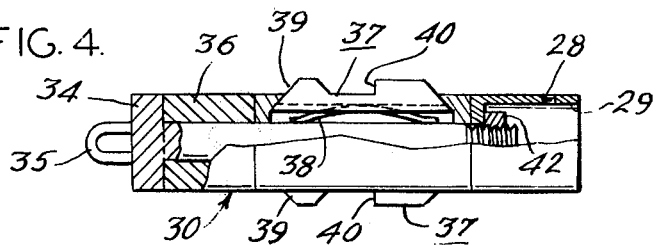
FIG. 4 is a front view, partly in section, of a placement tool utilized in the invention.

Refer now to FIG. 4. The placement tool mandrel 34 comprises the main body of the placement tool 30, around which all other elements are arranged. At its front end, mandrel 34 has an outwardly-extending U-shaped fitting 35 which comprises a wire rope connector. A spacer ring 36 surrounds the mandrel 34 (at the headed end thereof, adjacent fitting 35) to properly position a dog assembly 37 substantially at the mid-length of the tool 30. The dog assembly 37 is spring loaded (by means of a spring 38) such that it is yieldably biased outwardly beyond the main portion of the mandrel body. Dog assembly 37 has a front beveled surface 39 which is adapted to engage the composite V-shaped groove 21, 22 to provide a dog releasing action, and it also has a forwardly-facing locking surface 40 which is adapted to engage a rearwardly-facing locking surface 41 provided in connector groove 31 (FIG. 3).

The shear screw skirt 29, with its tapped holes 28, is mounted on mandrel 34, rearwardly of the dog assembly 37. A mandrel nut 42, threadedly secured to the rear end of mandrel 34, serves to retain all the above-mentioned elements on mandrel 34.

Refer again to FIG. 1. Assume that the receiver 8 has been welded to the outer end of the horizontal portion 5c of pipe 5, and that the connector 10 has been welded to the structure end of pipeline 4. Then, when the lower end of wire rope 9 has been passed to the pipe lay barge 12, the operator on the barge attaches the placement tool 30 to the wire rope 9, by means of the fitting or connector 35. Tool 30 is then placed in the connector nose 33 so that the spring-loaded placement tool dog assembly 37 engages the placement tool profile 31 in the connector, with locking surface 40 engaging the connector locking surface 41. The placement tool 30 is then rotated until the threaded holes 28 in the shear screw skirt 29 are aligned with the shear screw holes through the front locking dog assembly 20 of the connector 10. Shear screws 27 are passed through the dog assembly 20 and threaded into the placement tool skirt 29, holding the front connector dogs in the collapsed position (as shown in FIG. 3).

When the placement tool 30 has been locked into the connector 10 as just described, the pipeline 4, with its connector 10 and placement tool, are lowered to the bottom 3 by means of a cable system aboard the lay barge 12, comprising a lowering cable 43 connected to a winching system 44 aboard the lay barge. This is the situation illustrated in FIG. 1, the lower end of the wire rope 9 being attached to the placement tool 30 (not shown) inside the connector 10.

The winching system 11 aboard the structure 1 then pulls (by means of cable 9 attached to placement tool 30, the placement tool surface 40 engaging the connector surface 41) the connector 10 into the rear end of the receiver 8, thus mating the connector with the receiver. Since the front dog assembly 20 of the connector 10 is at this time held in the collapsed position by means of the shear screws 27, the front dog 20 passes through the front locking recess 19a of the receiver 8 without engaging, during this placement process. However, as the connector 10 is pulled into place in the receiver 8, the connector rear locking dogs 18 engage their recess 17 in the receiver.

When the connector 10 has been locked in place in this manner, the lay barge 12 may release the upper end of its lowering cable 43, or leave it in place with a buoy on the surface 2.

Slight additional movement into the receiver 8 causes the placement tool dog surface 39 to contact the releasing profile 21 in the receiver.

Continued movement in this same direction (by means of cable 9) collapses the placement tool dogs 37, thereby disengaging the dogs from their profile 31 in the connector 10. Once the dogs 37 are disengaged, the pull is transferred to the shear screws 27 made up in the skirt 29. This is the situation illustrated in FIG. 5. In this figure, the connector 10 is locked into the receiver 8 (connector dogs 18 in receiver recess 17), the placement tool dogs 37 have collapsed (dog assembly 37 out of profile 31 and out of releasing profile 21, 22), and the pull of wire rope 9 has been transferred to the shear screws 27.

Continued pull on wire rope 9 (to the right in FIG. 5) shears the screws 27, making the placement tool 30 free to be retrieved with the wire rope. Shearing of the screws 27 also releases the connector front dogs 20, at a position beyond their locking recess 19a in the receiver (they are shown in this "beyond" position in FIG. 5).

Thus, it may be said that the placement tool 30 disengages itself when the connector 10 is properly mated with and locked into the receiver 8. The wire rope 9 is then reeled to the surface 2. After detachment of the stuffing box 7, the placement tool 30 is removed from the end of the wire rope 9. After making sure that the wire rope is properly passed through the stuffing box 7, the setting tool 32 is attached to the wire rope 9.

Figure 6:
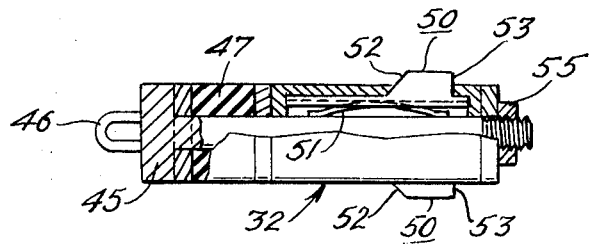
FIG. 6 is a front view, partly in section, of a setting tool utilized in the invention.

Refer now to FIG. 6, which illustrates the setting tool 32. The setting tool mandrel 45 comprises the main body of the setting tool 32, around which all other elements are arranged. At its front end, mandrel 45 has an outwardly-extending U-shaped fitting 46 which comprises a wire rope connector. Rearwardly of the head of mandrel 45, this mandrel carries a sealing element 47 which is adapted to fit tightly in the bore 48 of the receiver neck 49 (FIG. 2).

Toward the rear end of mandrel 45, a dog assembly 50 is mounted on this mandrel. The dog assembly 50 is spring loaded (by means of a spring 51) such that it is yieldably biased outwardly beyond the main portion of the mandrel body. Dog assembly 50 has a front beveled surface 52 for releasing purposes, and it also has a rearwardly-facing locking surface 53 which is adapted to engage a forwardly-facing locking surface 54 provided in connector groove 31 (FIG. 3). A mandrel nut 55, threadedly secured to the rear end of mandrel 45, serves to retain all the above-mentioned elements on mandrel 45.

Refer again to FIG. 1. A pump 56, whose discharge is connected to the tee fitting 6 below stuffing box 7, is adapted to supply a pressured fluid to the upper end of pipe 5.

After the placement tool 30 is removed from the end of the wire rope 9, the setting tool 32 is attached to the wire rope by means of the fitting or connector 46, after passing the wire rope through the stuffing box 7. Then, the setting tool is placed in the pipe 5, the stuffing box 7 is put in place, and pump pressure (from pump 56) is admitted into pipe 5 through the tee 6.

The setting tool 32 is pumped down and into the connector 10 (which is then locked into the receiver 8, as previously described), while playing out wire rope from the winching system 11. The spring loaded setting tool dogs 50 engage the setting tool profile 31 in the connector nose 33 (dog surface 53 engaging profile surface 54), leaving the setting tool sealing element 47 in the receiver neck 49.

When the setting tool thus seats in the connector, pump pressure is applied to set the sealing element 15 between the connector 10 and the receiver 8. More particularly, when the setting tool sealing element 47 is in the receiver neck 49, additional pump pressure is applied, causing the setting tool 32 and its sealing element 47 to act as a piston, moving the connector 10 rearward through the setting tool dog assembly 50 (surfaces 53 and 54). This rearward connector displacement (toward the left, from the position of the connector in FIG. 5) loads (i.e., flexes radially outwardly) the connector sealing element 15 against the receiver sealing surface 14, and engages the front connector dogs 20 in their receiver profile 19a. The shear screw holes through the connector 10 make it possible to set the sealing element 15 without creating a hydraulic lock between the sealing elements on the connector 10 and on the setting tool 32.

Figure 7:
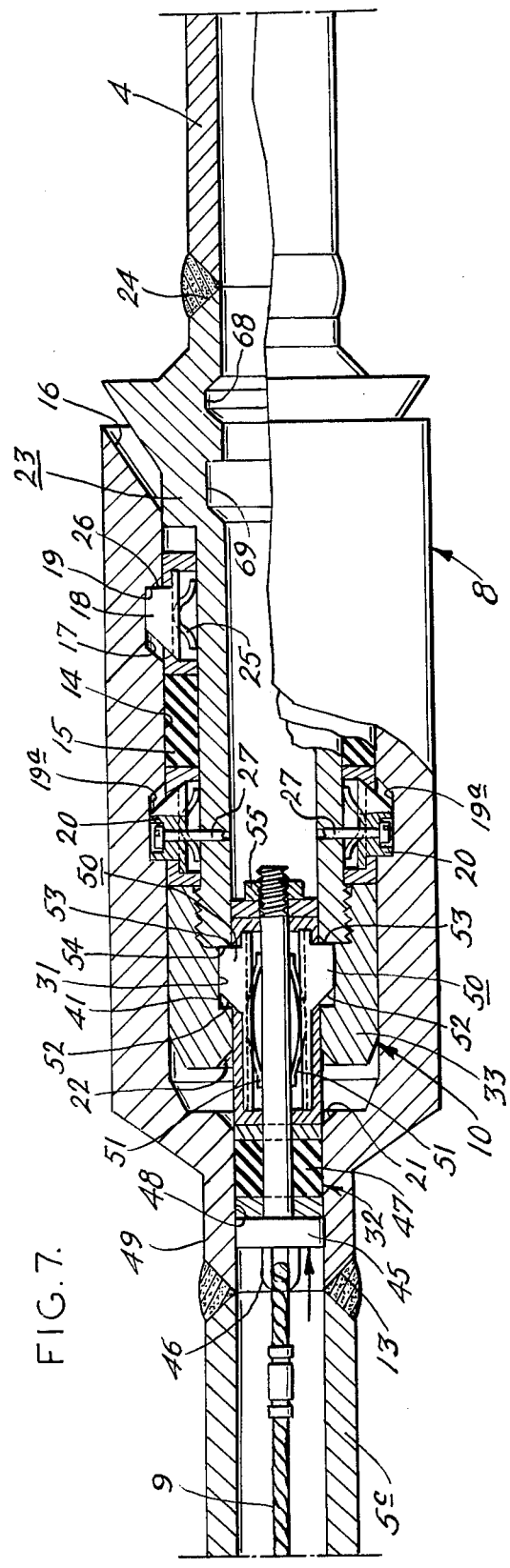
FIG. 7 is a longitudinal section of the assemblage of setting tool, connector fitting, and receiver fitting, during the setting procedure.

FIG. 7 illustrates the situation at the conclusion of the operation just described. In FIG. 7, the setting tool dogs 50 are engaged in the setting tool profile 31 of the connector 10. Pump pressure has been applied to the setting tool sealing element 47, forcing the connector mandrel 23 rearward (i.e., toward the left) and engaging the front connector locking dog assembly 20 in the receiver recess or profile 19a. The connector sealing element 15 is compressed and held in sealing position, against the interior wall of the receiver 8.

After releasing the pump pressure, the setting tool 32 is free to be retrieved (due to the beveled surface 52 on the dog assembly 50), and is reeled back to the surface by means of the wire rope 9. Thus, at this stage of the procedure, the connector 10 is locked in the receiver 8, and a pressure seal has been established between the connector and the receiver.

When the setting tool has been reeled back to the surface, it is removed from the end of the wire rope 9, and is replaced by a test tool, now to be described.

Figure 8:
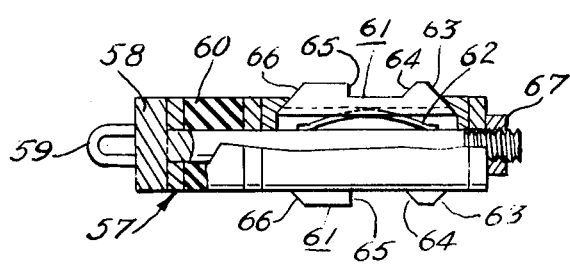
FIG. 8 is a front view, partly in section, of a test tool utilized in the invention.

Refer now to FIG. 8, which illustrates the test tool 57. The test tool mandrel 58 comprises the main body of the test tool 57, around which all other elements are arranged. At its front end, mandrel 58 has an outwardly-extending U-shaped fitting 59 which comprises a wire rope connector. Rearwardly of the head of mandrel 58, this mandrel carries a sealing element 60 which is adapted to fit rather closely in the main bore of the connector 10.

Toward the rear end of mandrel 58, a dog assembly 61 is mounted on this mandrel. The dog assembly 61 is spring loaded (by means of a spring 62) such that it is yieldably biased outwardly beyond the main portion of the mandrel body. Dog assembly 61 has rear bidirectional beveled surfaces 63 and 64 providing a releasing profile, plus a locking surface 65 and another beveled surface 66 for releasing at the forward end. A mandrel nut 67, threadedly secured to the rear end of mandrel 58, serves to retain all the aforementioned elements on mandrel 58.

Refer again to FIG. 3. The connector 10 has therein, beyond or to the rear of the connector sealing element 15, a test tool profile consisting of two recesses 68 and 69. These two recesses match the configuration of the test tool dog assembly 61, the rear recess 68 having a pair of beveled surfaces complementing the dog surfaces 63 and 64, and the front recess 69 having a locking surface complementing the dog surface 65 and also a beveled surface complementing the dog surface 66.

After the setting tool 32 is removed from the end of the wire rope 9, the test tool 57 is attached to the wire rope by means of the fitting or connector 59, following which the test tool is pumped into the locked and sealed connector 10 in a quite similar manner to the setting tool. The spring loaded test tool dogs 61 fail to engage the setting tool profile 31 in the connector, due to the releasing profile 63 on the test tool dogs. The releasing profile 63 passes through the setting tool profile 31 and causes the entire dog 61 to collapse, rather than engage.

Upon reaching the matching test tool profile 68, 69, however, the dogs 61 engage with the connector 10, thus plugging the inside of the connector mandrel 23, this seating and sealing taking place inside the connector at a point beyond the elements 15, etc. which seal between the connector and the receiver. Then, the pump pressure is increased to the desired test level, and held until a pressure tight seal between the connector 10 and the receiver 8 is confirmed.

Figure 9:
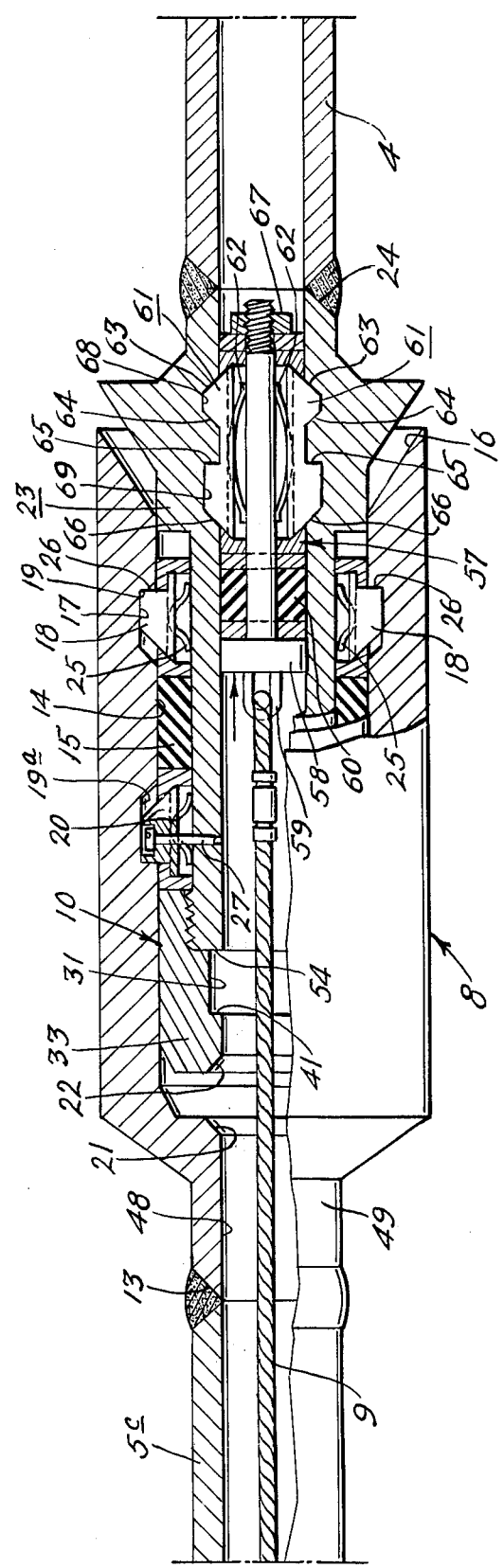
FIG. 9 is a longitudinal section of the assemblage of test tool, connector fitting, and receiver fitting, during the testing procedure.

FIG. 9 illustrates the situation during the testing procedure described. The test tool 57 is in place in the connector 10 (dogs 61 in the matching test tool profile in the connector), and pump pressure is applied against the test tool sealing element 60. The seal 15 between the connector 10 and the receiver 8 is exposed to test pressure.

When the pump pressure is released, the test tool 57 is free to be retrieved (due to the beveled surface 66 on the dog assembly 61). This test tool is retrieved, the stuffing box 7 is replaced with a blind flange, and the pipeline is ready to be put into service.

The invention claimed is:

1. In apparatus for connecting together at a submerged location two pipelines: a receiver fitting attached to the end of one of said lines, a connector fitting attached to the end of the other line; said receiver including means for accommodating therein said connector and being provided with a locking element which cooperates with a locking means carried by the connector to preliminarily lock the latter in said receiver; means operable from the surface for causing said connector to enter said receiver and to move to a position wherein it becomes preliminarily locked in said receiver by said locking element and said locking means; said receiver also being provided with an additional locking element which cooperates with additional locking means carried by the connector to complete the locking of the connector in the receiver; and means operable from the surface for causing said connector to move to a position wherein it becomes completely locked in said receiver by said additional locking element and said additional locking means.

2. In apparatus for connecting together at a submerged location two pipelines: a receiver fitting attached to the end of one of said lines, a connector fitting attached to the end of the other line; said receiver including means for accommodating therein said connector and being provided with a locking element which cooperates with a locking means carried by the connector to lock the latter in said receiver; means operable from the surface for causing said connector to enter said receiver and to move to a position wherein it becomes locked in said receiver by said locking element and said locking means; said connector also carrying an actuatable sealing element for sealing against an interior surface of said receiver; means operable from the surface for causing actuation of said sealing element to its sealing position; means operable from the surface for providing a seal in the internal bore of said connector; and means operable from the surface for applying fluid under pressure to the connecting apparatus to test the seal of said actuatable sealing element.

3. In apparatus for connecting together at a submerged location two pipelines: a receiver fitting attached to the end of one of said lines, a connector fitting attached to the end of the other line; said receiver including means for accommodating therein said connector and being provided with a locking element which cooperates with a locking means carried by the connector to preliminarily lock the latter in said receiver; means operable from the surface for causing said connector to enter said receiver and to move to a position wherein it becomes preliminarily locked in said receiver by said locking element and said locking means; said receiver being provided with an additional locking element for cooperating with additional locking means carried by the connector to complete the locking of the connector in the receiver; said connector also carrying an actuatable sealing element for sealing against an interior surface of said receiver; and means operable from the surface for causing said connector to move to a position wherein it becomes completely locked in said receiver by said additional locking element and said additional locking means, and for causing actuation of said sealing element to its sealing position.

4. Apparatus for connecting a submarine pipeline to a submerged structure, comprising a tubular conduit carried by said structure and extending from the water surface downwardly to a point adjacent the mud line, a receiver fitting attached to the lower end of said conduit, a connector fitting attached to the end of the pipeline which is to be connected to said structure; said receiver including means for accommodating therein said connector and being provided with a locking element for cooperating with locking means carried by the connector to preliminarily lock the latter in said receiver by said locking element and said locking means; means operable from the surface for causing said connector to enter said receiver and to move to a position wherein it becomes preliminarily locked in said receiver; said receiver being provided with an additional locking element for cooperating with additional locking means carried by the connector to complete the locking of the connector in the receiver; and means operable from the surface for causing said connector to move to a position wherein it becomes completely locked in said receiver by said additional locking element and said additional locking means.

5. Apparatus for connecting a submarine pipeline to a submerged structure, comprising a tubular conduit carried by said structure and extending from above the water surface downwardly to a point adjacent the mud line, a receiver fitting attached to the lower end of said conduit, a connector fitting attached to the end of the pipeline which is to be connected to said structure; said receiver including means for accommodating therein said connector and being provided with a locking element for cooperating with locking means carried by the connector to lock the latter in said receiver; means operable from the surface for causing said connector to enter said receiver and to move to a position wherein it becomes locked in said receiver; said connector also carrying an actuatable sealing element for sealing against an interior surface of said receiver by said locking element and said locking means; means operable from the surface for causing actuation of said sealing element to its sealing position; means operable from the surface for providing a seal in the internal bore of said connector; and means operable from the surface for applying fluid under pressure to the connecting apparatus to test the seal of said actuatable sealing element.

6. Apparatus for connecting a submarine pipeline to a submerged structure, comprising a tubular conduit carried by said structure and extending from above the water surface downwardly to a point adjacent the mud line, a receiver fitting attached to the lower end of said conduit, a connector fitting attached to the end of the pipeline which is to be connected to said structure; said receiver including means for accommodating therein said connector and being provided with a locking element for cooperating with locking means carried by the connector to preliminarily lock the latter in said receiver; means operable from the surface for causing said connector to enter said receiver and to move to a position wherein it becomes preliminarily locked in said receiver by said locking element and said locking means; said receiver being provided with an additional locking element for cooperating with additional locking means carried by the connector to complete the locking of the connector in the receiver, said connector also carrying an actuatable sealing element for sealing against an interior surface of said receiver; and means operable from the surface for causing said connector to move to a position wherein it becomes completely locked in said receiver by said additional locking element and said additional locking means, and for causing actuation of said sealing element to its sealing position.

7. In apparatus for connecting together at a submerged location two pipelines: a receiver fitting attached to the end of one of said lines, a connector fitting attached to the end of the other line; said receiver including means for accommodating therein said connector; means acting to preliminarily lock said connector in said receiver; said receiver being provided with a locking element for cooperating with locking means carried by the connector to complete the locking of the connector in the receiver; a retrievable tool, including means for releasably locking it in said connector, and operating to move said connector in response to the application of fluid under pressure to said tool, and means for applying fluid under pressure to said tool from the surface, thereby to move said connector to a position wherein it becomes completely locked in said receiver by said locking element and said locking means.

8. In apparatus for connecting together at a submerged location two pipelines: a receiver fitting attached to the end of one of said lines, a connector fitting attached to the end of the other line; said receiver including means for accommodating therein said connector; an actuatable sealing element carried by said connector for sealing against an interior surface of said receiver; a retrievable tool, including means for releasably locking it in said connector, and means, responsive to the application of fluid under pressure to said tool, to cause actuation of said sealing element to its sealing position; and means for applying a fluid under pressure to said tool from the surface, thereby to cause actuation of said sealing element to its sealing element to its sealing position.

9. In apparatus for connecting together at a submerged location two pipelines: a receiver fitting attached to the end of one of said lines, a connector fitting attached to the end of the other line; said receiver including means for accommodating therein said connector; an actuatable sealing element carried by said connector for sealing against an interior surface of said receiver, means acting to preliminarily lock said connector in said receiver; said receiver being provided with a locking element for cooperating with locking means carried by the connector to complete the locking of the connector in the receiver; a retrievable tool, including means for releasably locking it in said connector, and means for moving said connector, in response to the application of a fluid under pressure to said tool, to cause actuation of said sealing element to its sealing position; and means for applying a fluid under pressure to said tool from the surface, thereby to cause actuation of said sealing element to its sealing position and to move said connector to a position wherein it becomes completely locked in said receiver by said locking element and said locking means.

10. In apparatus for connecting together at a submerged location two pipelines: a receiver fitting attached to the end of one of said lines, a connector fitting attached to the end of the other line; said receiver including means for accommodating therein said connector; means providing a seal between the outside of said connector and an interior surface of said receiver; a retrievable tool, including means for releasably locking it in said connector, and means for providing a seal in the internal bore of said connector, thereby to enable the application of a test pressure to the first-mentioned seal; and means operable from the surface for applying a fluid under pressure to test the first-mentioned seal.

* * * * *